(12) United States Patent
Oh

(10) Patent No.: US 10,071,760 B2
(45) Date of Patent: Sep. 11, 2018

(54) ADAPTIVE FRONT STEERING SYSTEM FOR VEHICLE

(71) Applicant: Hyundai Motor Company, Seoul (KR)

(72) Inventor: Won Jin Oh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 61 days.

(21) Appl. No.: 15/276,018

(22) Filed: Sep. 26, 2016

(65) Prior Publication Data

US 2017/0291633 A1     Oct. 12, 2017

(30) Foreign Application Priority Data

Apr. 12, 2016 (KR) .................. 10-2016-0044630

(51) Int. Cl.
*B62D 5/04* (2006.01)
*B62D 5/00* (2006.01)
*B62D 6/02* (2006.01)
*B62D 6/10* (2006.01)

(52) U.S. Cl.
CPC ......... *B62D 5/0415* (2013.01); *B62D 5/008* (2013.01); *B62D 5/0484* (2013.01); *B62D 6/02* (2013.01); *B62D 6/10* (2013.01)

(58) Field of Classification Search
CPC .... B62D 5/0415; B62D 5/008; B62D 5/0484; B62D 6/02; B62D 6/10
See application file for complete search history.

(56) References Cited

U.S. PATENT DOCUMENTS

| 4,556,116 A | 12/1985 | O'Neil |
| 7,306,535 B2 | 12/2007 | Menjak et al. |
| 7,568,989 B2 * | 8/2009 | Naka ............ B62D 5/008 475/28 |
| 7,665,572 B2 * | 2/2010 | Yamanaka ....... B62D 5/008 180/402 |
| 7,878,294 B2 * | 2/2011 | Morikawa ....... B62D 5/0415 180/204 |
| 8,775,025 B2 * | 7/2014 | Yamaguchi ...... B62D 5/008 180/446 |
| 2014/0352465 A1 * | 12/2014 | Chae ............ F16H 19/04 74/30 |

FOREIGN PATENT DOCUMENTS

| JP | H10287250 A | 10/1998 |
| JP | 2003-063423 A | 3/2003 |
| JP | 2005-112025 A | 4/2005 |
| JP | 2008-273327 A | 11/2008 |
| JP | 2010-076735 A | 4/2010 |
| KR | 10-2008-0113690 A | 12/2008 |
| KR | 2010-0094731 A | 8/2010 |
| KR | 2015-0012827 A | 2/2015 |

* cited by examiner

*Primary Examiner* — Tony H Winner
*Assistant Examiner* — Marlon A Arce
(74) *Attorney, Agent, or Firm* — Mintz Levin Cohn Ferris Glovsky and Popeo, P.C.; Peter F. Corless

(57) ABSTRACT

An adaptive front steering system is capable of ensuring steering convenience and driving safety by changing a steering gear ratio in accordance with a driving situation of a vehicle. The adaptive front steering system is implemented as a new type of active front steering (AFS) system in which a hollow motor is applied to a steering column shaft, and a steering gear ratio is changed in accordance with a rotation direction and a rotation amount of a shaft of the hollow motor which is rotated together with an upper shaft.

6 Claims, 3 Drawing Sheets

ADAPTIVE FRONT STEERING SYSTEM FOR VEHICLE

CROSS-REFERENCE TO RELATED APPLICATION

This application claims under 35 U.S.C. § 119(a) the benefit of Korean Patent Application No. 10-2016-0044630 filed on Apr. 12, 2016, the entire contents of which are incorporated herein by reference.

BACKGROUND

(a) Technical Field

The present invention relates to an adaptive front steering system for a vehicle, more particularly, to an adaptive front steering system capable of ensuring steering convenience and driving safety by changing a steering gear ratio in accordance with a driving situation of a vehicle.

(b) Description of the Related Art

In general, a power steering system, which generates steering force for a vehicle, is designed to use hydraulic pressure in order to allow a steering wheel to be softly and smoothly operated and enable a quick steering operation.

The power steering system may allow a driver to perform a steering operation with less effort, may be selected regardless of operating force of a steering gear ratio, and may also absorb impact caused by an uneven road surface and thus prevent the impact from being transmitted to the steering wheel.

An electric steering system such as an electrohydraulic power steering (EHPS) system or a motor driven power steering (MDPS) system is widely applied, in which an engine control unit (ECU) operates a motor in accordance with driving conditions of the vehicle, which are detected by a vehicle speed sensor, a steering torque sensor, and the like, so as to provide soft and comfortable steering quality when the vehicle travels at a low speed and hard steering quality and excellent directional stability when the vehicle travels at a high speed, thereby providing the driver with an optimal steering condition.

The recent trend is that a system is applied which is made by integrating the MDPS system with an active front steering (AFS) system so as to further optimize a steering condition to be provided to the driver.

Usually, the AFS system is a system that changes a steering gear ratio for each vehicle speed so as to reduce steering effort of the steering wheel while a vehicle is stopped and parked and implements an optimum steering gear ratio while a vehicle travels at a high speed.

For example, in the case of an AFS system of an active front wheel steering type, a steering angle may be increased or decreased by an actuator as well as a driver, thereby improving steering responsiveness by reducing a steering ratio when a vehicle travels at a low speed, and allowing a driver to stably drive a vehicle by increasing a steering ratio even when the vehicle travels at a high speed.

The AFS system, due to driving characteristics thereof, includes an actuator such as a motor and a decelerator, which produces an additional steering input other than a steering input from a driver, and an AFS ECU which changes the steering output by controlling the actuator.

As the AFS system is applied to mass-produced vehicles, marketability of the AFS system is acknowledged, but because of high-priced option costs, the AFS system typically is applied only to premium vehicles.

The reason is that material costs are inevitably high because of complexity of the system and a larger number of components.

Therefore, in order to widely apply the AFS system, there is a need for development of a lower-end AFS system in order to simplify the system and reduce material costs by reducing the number of components.

The above information disclosed in this Background section is only for enhancement of understanding of the background of the invention and therefore it may contain information that does not form the prior art that is already known in this country to a person of ordinary skill in the art.

SUMMARY

The present invention provides a lower-end adaptive front steering system which is implemented as a new type of AFS system in which a hollow motor is applied to a steering column shaft, and a steering gear ratio is changed in accordance with a rotation direction and a rotation amount of a shaft of the motor which is rotated together with an upper shaft, such that the entire system may be simplified and material costs may be reduced by reducing the number of components.

In one aspect, the present invention provides an adaptive front steering system for a vehicle, including: an upper shaft which is connected with a steering wheel; a lower shaft which serves as an output shaft; and a hollow motor which is coaxially disposed on a steering column shaft and connected between the upper shaft and the lower shaft.

In a preferred embodiment, a motor housing of the hollow motor may be connected to the upper shaft and a motor shaft of the hollow motor may be connected to the lower shaft, such that a steering gear ratio is changed in accordance with a rotation direction and a rotation amount of the motor shaft of the hollow motor which is rotated together with the upper shaft.

In another preferred embodiment, the motor housing of the hollow motor and the upper shaft may be connected by an upper planetary gear train.

In still another preferred embodiment, the upper planetary gear train may include: a sun gear which is mounted on the upper shaft; a ring gear which is mounted on a housing adapter of the motor housing; and a plurality of planet gears interposed between the sun gear and the ring gear, the planet gears meshing with the sun gear and the ring gear so as to transmit power.

In yet another preferred embodiment, the motor shaft of the hollow motor and the lower shaft may be connected by a lower planetary gear train.

In still yet another preferred embodiment, the lower planetary gear train may include: a sun gear which is mounted on the lower shaft; a ring gear which is mounted on a shaft adapter of the motor shaft; and a plurality of planet gears interposed between the sun gear and the ring gear, the planet gears meshing with the sun gear and the ring gear so as to transmit power.

In a further preferred embodiment, the adaptive front steering system may further include: a locking unit which serves to couple the upper shaft and the lower shaft when a motor driven power steering (MDPS) system fails; and a torque and angle sensor (TAS) which is installed on the upper shaft and transmits information on a steering angle and steering torque to an engine control unit (ECU).

The adaptive front steering system provided by the present invention has the following advantages.

First, since the motor is coaxially installed on the steering column shaft, the number of components is reduced compared to the existing AFS system having a worm shaft and worm wheel structure or the existing AFS system having a belt structure, and the motor housing is rotated together with the upper shaft so as to directly determine a rotation angle of an output shaft, such that the system may be simplified because complicated gear trains are not required, material costs may be reduced because the number of components is reduced, and as a result, a compact AFS system may be designed, such that there is an advantage in terms of packaging.

Second, wires connected to the motor housing may be twisted when the motor housing is rotated, but the problem in that wires are twisted may be solved because the planetary gear trains are applied at upper and lower sides of the motor, respectively, and the motor is designed to be rotated only within a range of ±90°.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
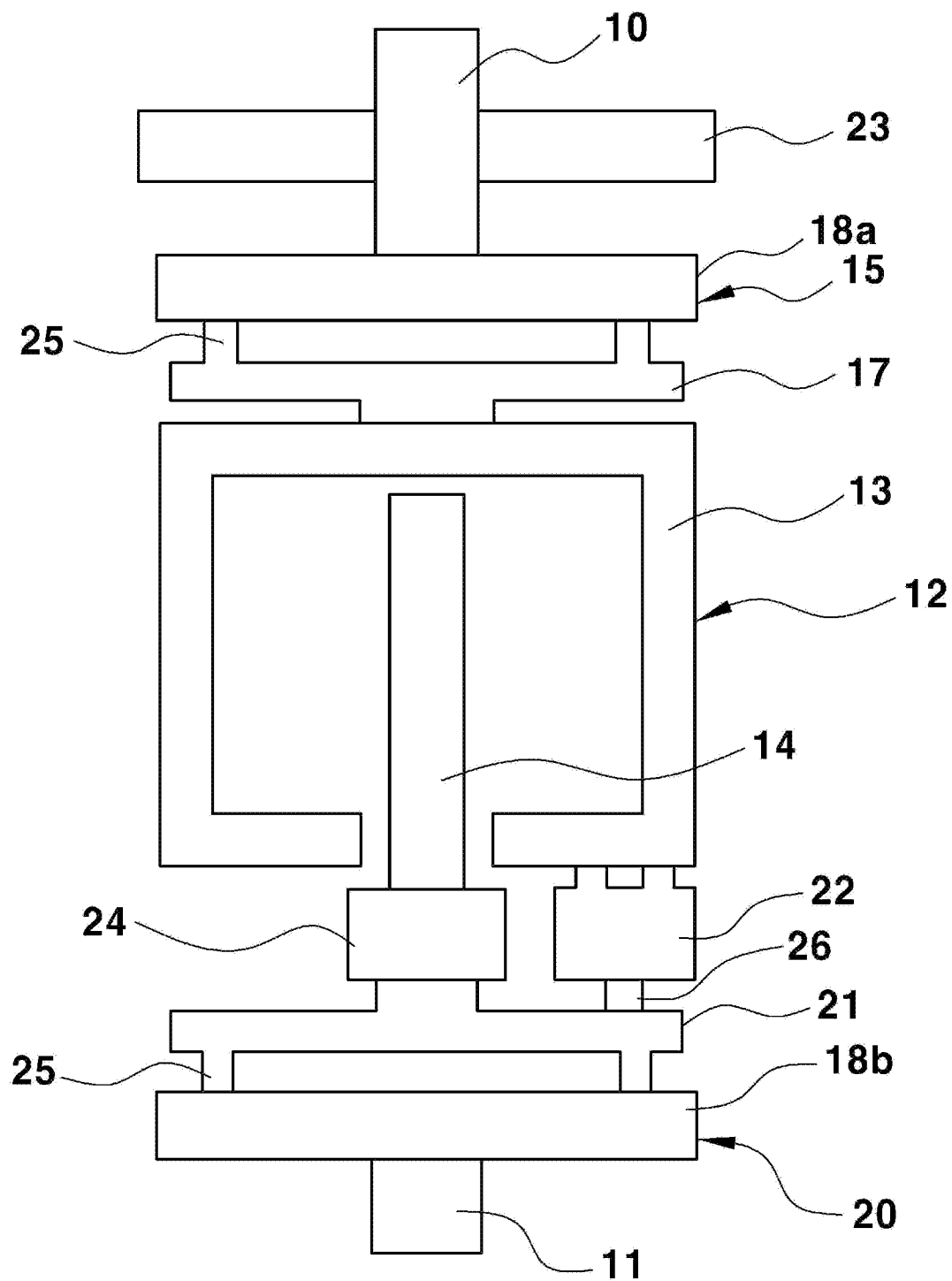
FIG. 1 is a schematic cross-sectional view illustrating an adaptive front steering system according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in detail with reference to the accompanying drawings.

Figure 2:
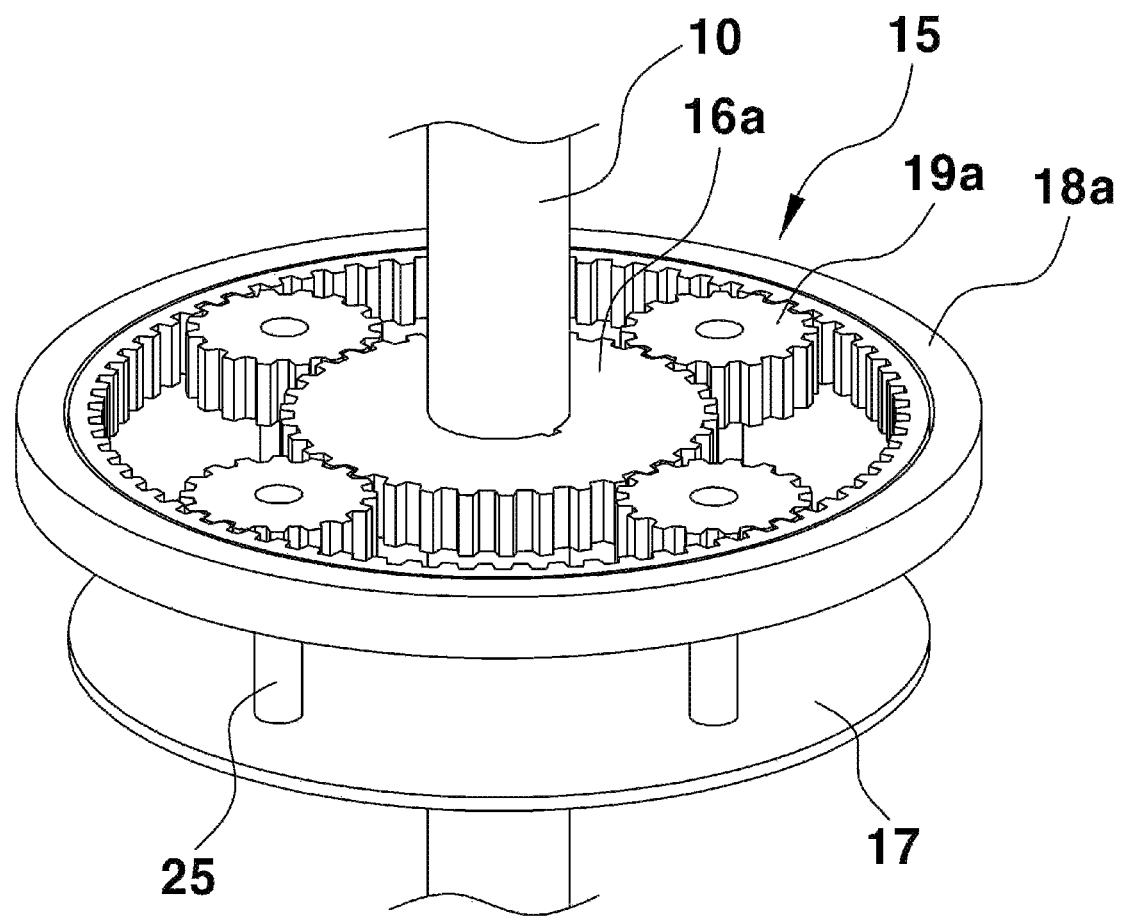
FIG. 2 is a perspective view illustrating an upper planetary gear train of the adaptive front steering system according to the exemplary embodiment of the present invention.
Figure 3:
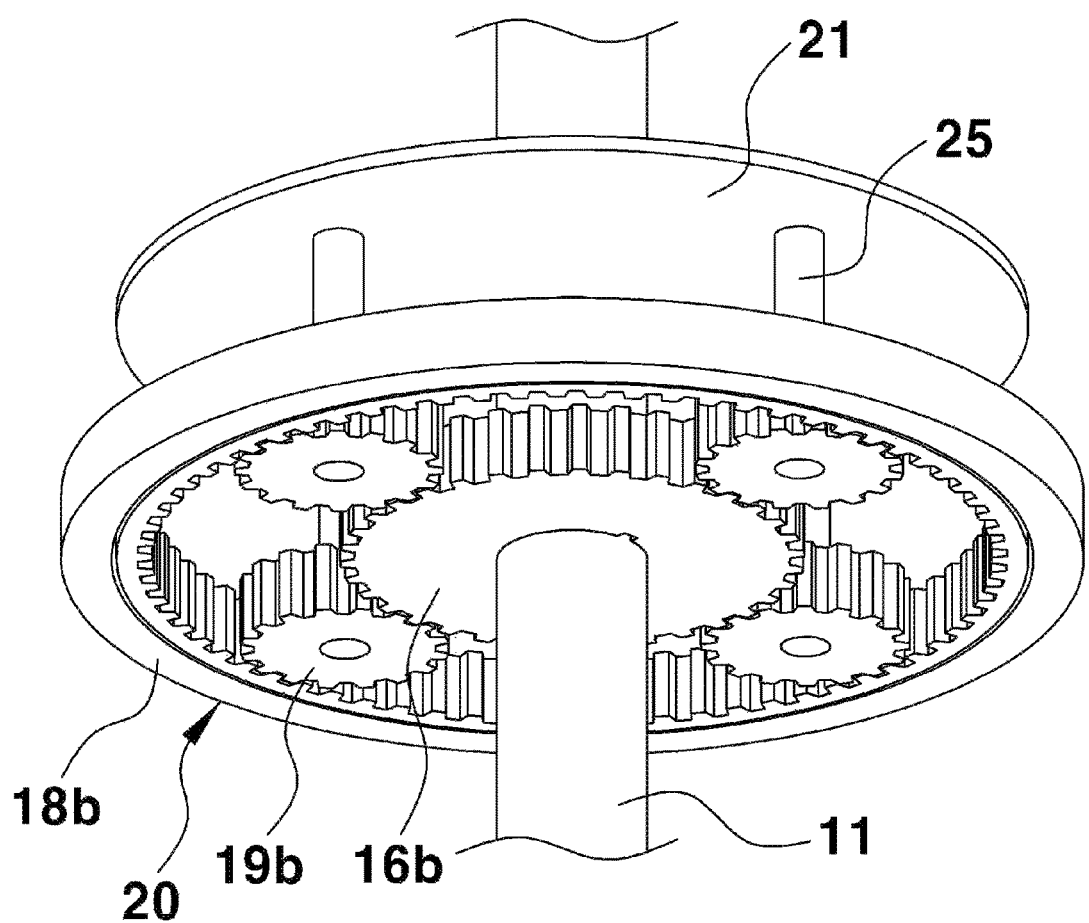
FIG. 3 is a perspective view illustrating a lower planetary gear train of the adaptive front steering system according to the exemplary embodiment of the present invention.

FIG. 1 is a schematic cross-sectional view illustrating an adaptive front steering system according to an exemplary embodiment of the present invention, and FIGS. 2 and 3 are perspective views illustrating an upper planetary gear train and a lower planetary gear train of the adaptive front steering system according to the exemplary embodiment of the present invention.

As shown in FIGS. 1 to 3, the adaptive front steering system is implemented as a lower-end model that improves steering convenience and driving stability by changing a steering gear ratio in accordance with a driving situation of a vehicle equipped with a motor driven power steering system (MDPS).

For example, the adaptive front steering system has a structure in which a hollow motor on a steering column shaft is used, a motor housing is connected to an upper shaft, a motor shaft is connected to a lower shaft, and the upper shaft and the lower shaft are not mechanically connected and may move relative to each other.

That is, unlike the existing AFS that adjusts a rotation angle by using a planet or harmonic gear, or a worm-and-worm wheel, the adaptive front steering system provided by the present invention is configured as a system in which a steering gear ratio is changed in accordance with a rotation direction and a rotation amount of the motor shaft of the hollow motor which is rotated together with the upper shaft.

To this end, the adaptive front steering system includes an upper shaft 10 connected to a steering wheel (not shown).

The upper shaft 10 is disposed coaxially with a steering column shaft (not shown) and coupled to the steering column shaft by a flange fastening structure (not shown) or a coupler (not shown) connecting structure, and the upper shaft 10 is operated at the same speed and the same angle as those of the steering wheel operated by a driver.

In this case, in order to recognize a driver's steering intention, a TAS 23 is coaxially installed on the upper shaft 10, and information on a steering angle and steering torque is transmitted from the TAS 23 to an engine control unit (ECU).

The adaptive front steering system includes a lower shaft 11 which serves as a final output shaft of the operation of the steering wheel.

The lower shaft 11 is disposed coaxially with the upper shaft 10, and supported by being connected to a lower planetary gear train 20 to be described below.

Power outputted from the lower shaft 11 may be transmitted to a gearbox (not shown).

The adaptive front steering system includes a hollow motor 12 which is disposed coaxially with the steering column shaft and connected between the upper shaft 10 and the lower shaft 11.

The hollow motor 12 includes a motor housing 13 and a motor shaft 14, and is connected to the upper shaft 10 and the lower shaft 11 in a state in which the motor housing 13 is directed upward and the motor shaft 14 is directed downward.

For example, the motor housing 13 may be connected to the upper shaft 10 through an upper planetary gear train 15 by using a circular plate-shaped housing adapter 17 formed at a rear portion of the motor housing 13.

The motor shaft 14 may be connected to the lower shaft 11 through the lower planetary gear train 20 by using a circular plate-shaped shaft adapter 21 connected to a tip portion of the motor shaft 14 by a coupler 24.

The hollow motor 12 is electrically connected with the ECU, and rotated by being supplied with electric power from the ECU.

Because the motor shaft 14 of the hollow motor 12 is not mechanically fixed to the upper shaft 10, the motor shaft 14 may be rotated only by electric current adjusted by the ECU regardless of the rotation of the upper shaft 10.

The adaptive front steering system includes the two planetary gear trains, that is, the upper planetary gear train 15 and the lower planetary gear train 20 which are positioned above and below the hollow motor 12 and transmit power among the hollow motor 12, the upper shaft 10, and the lower shaft 11.

Because a ring gear is fixed and thus a gear ratio is fixed, the planetary gear train does not have an effect on a change in steering angle.

That is, unlike a function of the planetary gear train in the AFS system using the existing planetary gear train (a change in steering gear ratio), the planetary gear train serves to reduce a rotation angle of the motor housing 13 connected with the upper shaft 10, and maintain a rotation gear ratio between the upper shaft 10 and the lower shaft 11 to 1:1 when the system fails.

The adaptive front steering system includes the upper planetary gear train 15 which transmits power between the upper shaft 10 and the hollow motor 12.

The upper planetary gear train 15 includes a combination of a sun gear 16a, a ring gear 18a, and a plurality of planet gears 19a.

Here, the sun gear 16a is coaxially mounted on the upper shaft 10 and may be rotated together with the upper shaft 10, the ring gear 18a is concentrically disposed at an outer periphery of the sun gear 16a and fixedly installed by being supported by a steering column (not shown), and the planet gears 19a are disposed in a gap between the sun gear 16a at a center and the ring gear 18a at an outer periphery and mesh with the sun gear 16a and the ring gear 18a so as to transmit power, such that the planet gears 19a are rotated and revolved at the same time.

In this case, the planet gears 19a may be four gears disposed at predetermined intervals, and the respective planet gears 19a may be freely and rotatably supported by gear shafts 25 which vertically extend from an upper surface of the housing adapter 17 formed on the motor housing 13.

Therefore, when the upper shaft 10 is rotated as the driver operates the steering wheel, the sun gear 16a is rotated, and the respective planet gears 19a are rotated with respect to the stationary ring gear 18a and simultaneously revolved around the sun gear 16a, and as a result, the motor housing 13, which includes the housing adapter 17 having the planet gears 19a, may be entirely rotated about an axis of the upper shaft.

That is, when the upper shaft 10 is rotated, the rotation is transmitted to the upper planetary gear train 15, and as a result, the motor housing 13 is also rotated.

In this case, a rotation angle of the motor housing 13 is more decreased than that of the upper shaft 10 by a gear ratio of the upper planetary gear train 15.

As an example, in a case in which a gear ratio of the upper planetary gear train 15 is 1:4, the motor housing 13 rotates 90° when the steering wheel rotates 360°. As the gear ratio is adjusted as described above, the motor housing 13 may rotate about 180° even when the steering wheel is in a lock-to-lock state.

This rotation angle may solve the problem in that a power line or a signal line, which needs to be connected to the hollow motor, is twisted due to the rotation of the motor housing 13.

The adaptive front steering system includes the lower planetary gear train 20 which transmits power between the lower shaft 11 and the hollow motor 12.

Like the upper planetary gear train 15, the lower planetary gear train 20 includes a combination of a sun gear 16b, a ring gear 18b, and a plurality of planet gears 19b.

Here, the sun gear 16b is coaxially mounted on the lower shaft 11 and may be rotated together with the lower shaft 11, the ring gear 18b is concentrically disposed at an outer periphery of the sun gear 16b and fixedly installed by being supported by a steering column (not shown), and the planet gears 19b are disposed in an interval between the sun gear 16b at a center and the ring gear 18b at an outer periphery and mesh with the sun gear 16b and the ring gear 18b so as to transmit power, such that the planet gears 19b are rotated and revolved at the same time.

In this case, the planet gears 19b may be four gears disposed at predetermined intervals, and the respective planet gears 19b may be freely and rotatably supported by gear shafts 25 which vertically extend from a bottom surface of the shaft adapter 21 connected to the motor shaft 14 by the coupler 24.

Therefore, when the motor shaft 14 of the hollow motor 12 is rotated by being controlled by the ECU, the respective planet gears 19b disposed on the shaft adapter 21 of the motor shaft 14 are rotated and revolved with respect to the stationary ring gear 18b, and the sun gear 16b is rotated in connection with the rotation and the revolution of the planet gears 19b, such that a steering operation may be performed as power is outputted through the lower shaft 11 rotated together with the sun gear 16b.

In this case, the steering gear ratio may be changed in accordance with a rotation direction and a rotation amount of the motor shaft 14.

The adaptive front steering system includes a locking unit 22 which serves to couple the upper shaft 10 and the lower shaft 11 when a motor driven power steering (MDPS) system fails.

The locking unit 22 is the type that uses a solenoid valve, and the locking unit 22 is installed at one side of a front surface (bottom surface) of the motor housing 13 and operated by being selectively coupled to the shaft adapter 21.

Here, the solenoid valve type locking unit may adopt the similar structure and method to a solenoid valve type locking unit applied to a typical AFS system.

As an example, a plunger 26 of the solenoid valve is inserted and fastened into a hole (not shown) or a groove (not shown) formed in the shaft adapter 21 when the locking unit 22 is operated, and as a result, the motor housing 13 and the shaft adapter 21 having the motor shaft 14 may be coupled to each other.

That is, because the upper shaft 10 and the lower shaft 11 are not mechanically fixed, the lower shaft 11 does not move even though the upper shaft 10 rotates when the MDPS system fails.

To this end, the locking unit 22 using the solenoid valve is needed.

With the locking unit 22, the motor housing 13 and the shaft adapter 21 adjacent to the lower planetary gear train are typically connected to each other when an engine is turned off or in a fail mode.

For example, if there is no lower planetary gear train 20, a minimum rotation radius may become very large because the lower shaft 11 rotates 90° even though the steering wheel rotates 360°.

To prevent the minimum rotation radius from being large, the lower planetary gear train 20 is disposed between the motor shaft 14 and the lower shaft 11, such that an overall steering gear ratio may be maintained to 1:1 even when the MDPS fails.

The planetary gear train in the typical AFS system is a means for changing the steering gear ratio, but the upper planetary gear train 15 provided by the present invention serves to reduce a rotation angle of the motor housing 13, and the lower planetary gear train 20 serves to adapt the overall steering gear ratio to 1:1 when the MDPS fails.

Therefore, when the driver operates the steering wheel, the operating force may be outputted through the upper shaft 10→the upper planetary gear train 15→the hollow motor 12→the lower planetary gear train 20→the lower shaft 11, such that the steering operation may be performed. Furthermore, the steering gear ratio is changed in accordance with a rotation amount of the motor shaft 14 when the hollow motor 12 is operated in accordance with a situation in which the vehicle travels, and as a result, steering convenience and driving stability may be ensured.

As described above, in the present invention, since the AFS system equipped with the hollow motor and the planetary gear trains disposed in two rows is applied, there is an advantage in terms of costs and packaging because the number of components is reduced compared to the existing AFS system using the planetary gear train.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An adaptive front steering system for a vehicle, comprising:
    an upper shaft which is connected with a steering wheel;
    a lower shaft which serves as an output shaft; and
    a hollow motor which is connected between the upper shaft and the lower shaft,
    wherein a motor housing of the hollow motor is connected to the upper shaft, and a motor shaft of the hollow motor is connected to the lower shaft, such that a steering gear ratio is changed in accordance with a rotation direction and a rotation amount of the motor shaft of the hollow motor which is rotated together with the upper shaft, and
    wherein the motor shaft of the hollow motor and the lower shaft are connected by a lower planetary gear train.

2. The adaptive front steering system of claim 1, wherein the motor housing of the hollow motor and the upper shaft are connected by an upper planetary gear train.

3. The adaptive front steering system of claim 2, wherein the upper planetary gear train includes:
    a sun gear which is mounted on the upper shaft;
    a ring gear which is mounted on a housing adapter of the motor housing; and
    a plurality of planet gears interposed between the sun gear and the ring gear, the planet gears meshing with the sun gear and the ring gear so as to transmit power.

4. The adaptive front steering system of claim 1, wherein the lower planetary gear train includes:
    a sun gear which is mounted on the lower shaft;
    a ring gear which is mounted on a shaft adapter of the motor shaft; and
    a plurality of planet gears interposed between the sun gear and the ring gear, the planet gears meshing with the sun gear and the ring gear so as to transmit power.

5. The adaptive front steering system of claim 1, further comprising:
    a locking unit which serves to couple the upper shaft and the lower shaft when a motor driven power steering (MDPS) system fails.

6. The adaptive front steering system of claim 1, wherein a torque and angle sensor (TAS), which transmits information on a steering angle and steering torque to an engine control unit (ECU), is installed on the upper shaft.

* * * * *